United States Patent [19]

Niemi et al.

[11] Patent Number: 5,664,048
[45] Date of Patent: Sep. 2, 1997

[54] SPEED CONTROL CIRCUIT FOR A DC MOTOR

[75] Inventors: Bill H. Niemi; Stephen J. Kreinick, both of San Diego, Calif.

[73] Assignee: Abbott Laboratories, Abbott Park, Ill.

[21] Appl. No.: 146,627

[22] Filed: Oct. 29, 1993

Related U.S. Application Data

[63] Continuation of Ser. No. 613,424, Nov. 14, 1990, abandoned.

[51] Int. Cl.⁶ .................................................. H02P 5/168
[52] U.S. Cl. .......................... 388/815; 388/902; 388/910
[58] Field of Search .............................. 388/809–824, 388/907.5, 902, 910

[56] References Cited

U.S. PATENT DOCUMENTS

| | | |
|---|---|---|
| 3,508,134 | 4/1970 | Dosch et al. . |
| 3,539,893 | 11/1970 | Tong . |
| 3,568,027 | 3/1971 | Bacon et al. . |
| 3,855,520 | 12/1974 | Stich ........................... 323/19 |
| 4,091,314 | 5/1978 | Johnson . |
| 4,107,585 | 8/1978 | Waddington . |
| 4,112,340 | 9/1978 | Clarke . |
| 4,266,168 | 5/1981 | Anderson . |
| 4,275,342 | 6/1981 | Kawada et al. . |
| 4,303,874 | 12/1981 | Iwai . |
| 4,345,189 | 8/1982 | Kukaya et al. ................. 388/821 |
| 4,346,335 | 8/1982 | McInnis . |
| 4,390,823 | 6/1983 | Brown et al. . |
| 4,447,767 | 5/1984 | Holt ................................ 318/139 |
| 4,449,080 | 5/1984 | Konrad et al. .................. 318/139 |
| 4,508,999 | 4/1985 | Melocik et al. . |
| 4,510,423 | 4/1985 | Iwasawa . |
| 4,549,122 | 10/1985 | Berkopec et al. . |
| 4,675,586 | 6/1987 | Eigner et al. . |
| 4,691,149 | 9/1987 | Baumgartner et al. . |
| 4,734,628 | 3/1988 | Bench et al. . |
| 5,010,582 | 4/1991 | Kawamura ................. 388/910 X |

Primary Examiner—David S. Martin
Attorney, Agent, or Firm—Harry G. Thibault; Thomas M. Breininger

[57] ABSTRACT

A speed control circuit for a DC motor includes a digital-to-analog (D/A) converter, a regulator/controller, and a control circuit which applies a compensating current to the DC motor that compensates for variations in loading applied to the motor. The regulator/controller compares a reference voltage provided by the D/A converter with a feedback signal provided by the motor to generate a signal to activate the control circuit, thus to supply a compensating current to the motor.

31 Claims, 3 Drawing Sheets

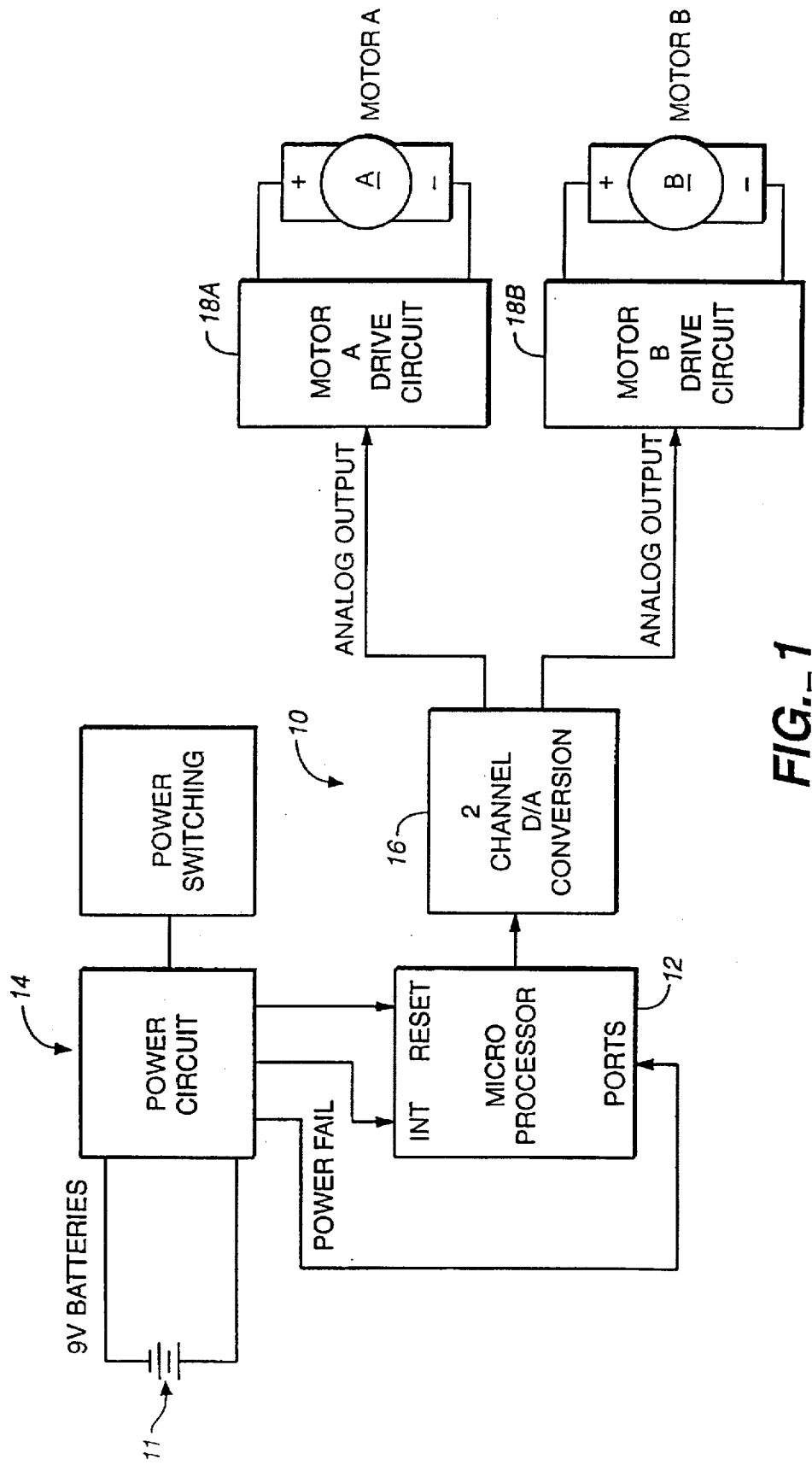
FIG._1

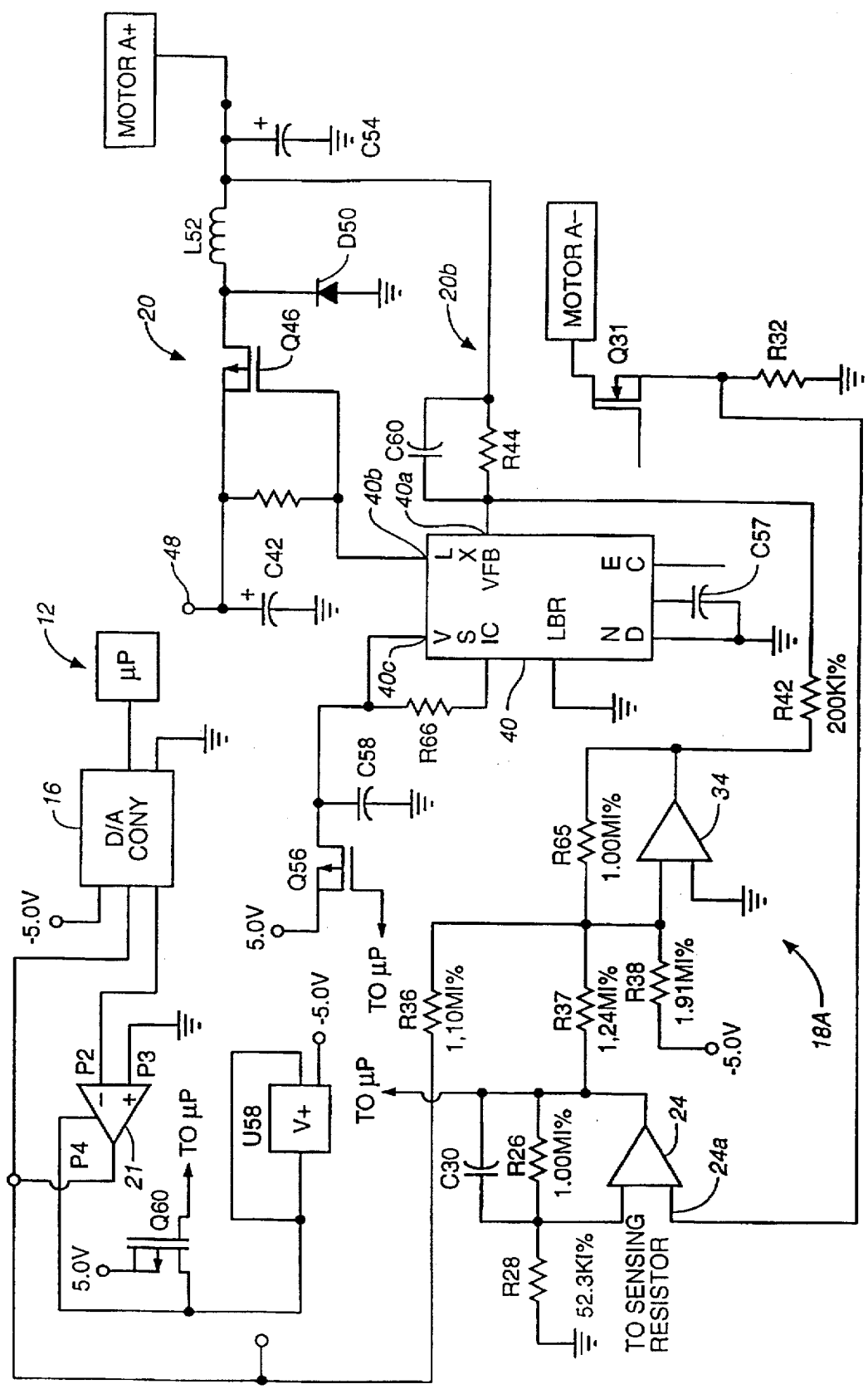
FIG._2

FIG._3A  MOTOR TORQUE AT A  ← APPROX. 1 SEC. TO 10 SEC. →
FIG._3B  CURRENT THROUGH R32 (PROPORTIONAL TO MOTOR TORQUE)
FIG._3C  VOLTAGE APPLIED TO MOTOR A (FROM MOTOR CONTROL CIRCUIT)
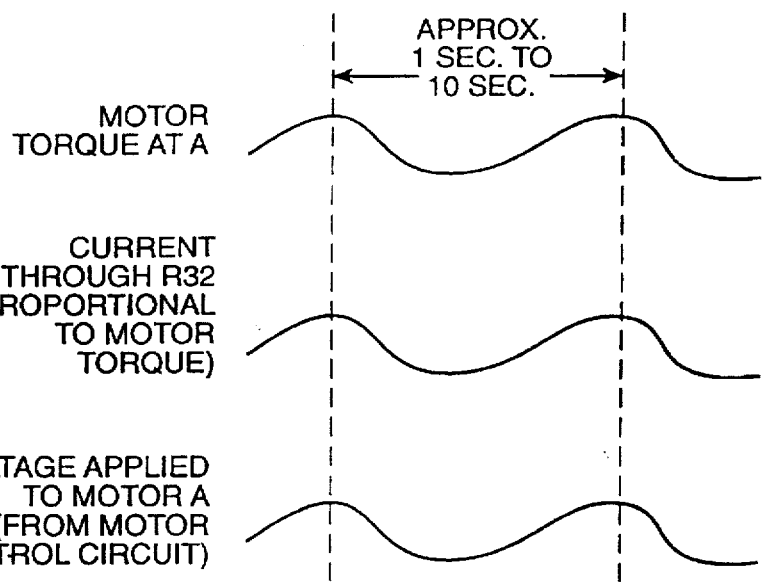
FIG._3D  CURRENT THROUGH L52
FIG._3E  VOLTAGE ACROSS D50
APPROX. V PEAK = 9.0V
APPROX. -0.4V
PERIOD T - 50 MICROSECONDS (DETERMINED BY C57)
FIG._3F  U40 INT. REF.V
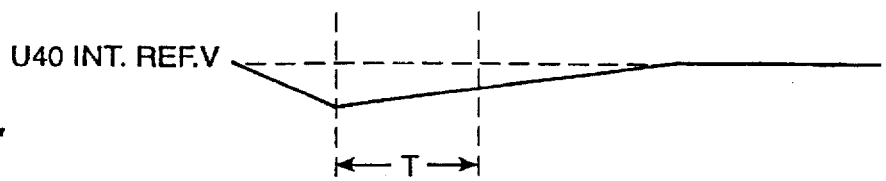
FIG._3G  U40, PIN 4 VOLTAGE 0V — Q46 OFF — Q46 ON
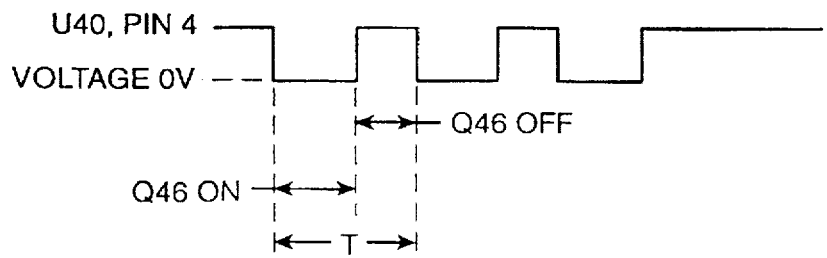

SPEED CONTROL CIRCUIT FOR A DC MOTOR

This application is a continuation application based on prior application Ser. No. 07/613,424 filed on Nov. 14, 1990, now abandoned.

BACKGROUND OF THE INVENTION

1. Field of the Invention

This invention relates to motor control circuits and more particularly to motor control circuits for speed regulation, specifically speed control circuits for DC motors.

2. Description of the Prior Art

The use of back or counter EMF voltage of a motor for monitoring motor speed is known. For example, in U.S. Pat. No. 3,539,893, a circuit samples the back EMF of a motor and uses that signal to vary the amount of energy applied to the motor. Current is applied to the motor for variable lengths of time as a function of the back EMF. The back EMF produces a voltage across a capacitor that controls the period of a single-shot multivibrator and thus controls current flow to the motor.

In U.S. Pat. No. 4,549,122, the full load current for a motor is regulated in response to the counter EMF of the motor. By reducing the current, operation of the motor at higher speeds is affected. However, this circuit relies upon a three-phase AC source and is not particularly relevant to controlling a DC motor.

In U.S. Pat. No. 4,266,168, the back EMF voltage of a DC motor is periodically sampled and compared against a reference set point voltage to produce a signal for controlling an up/down counter. The output of the up/down counter is input to a multiplying digital-to-analog converter having an output which is fed back to a summing junction for developing the DC voltage applied to the motor. However, a system which uses sampling techniques may not be suitable if a pulsed output must be avoided.

Moreover, the known circuitry using back EMF for motor speed control possesses substantial disadvantages, particularly when considered for use in the speed control circuit of a DC motor driven by an analog input. Although the known AC circuitry is incompatible and unsuitable in DC motor control applications, the pulsed input typically used to effect speed corrections in motor control circuits for DC motors may also be unsuitable for certain motor drive systems.

For example, a DC motor driven by a microprocessor controlled analog output can require a smoothed speed correction input which is compatible with its analog input and which avoids the spiked input to the motor of prior circuits to improve circuit efficiency and to increase and maximize brush and gear box life.

SUMMARY OF THE INVENTION

In the present invention, a microprocessor-driven DC motor receives the analog output of digital to analog (D/A) converter which sets the speed reference for a motor drive circuit. The motor drive circuit controls the speed of the DC motor.

The motor drive circuit controls the motor so that it is driven at the input speed determined by the output of the D/A converter. The D/A converter input is a digital speed control signal provided by a microprocessor control. The motor drive circuit thus provides an analog current input to the permanent magnet DC motor to control the motor speed.

In accordance with the present invention, motor speed is maintained relatively constant by a servo system which utilizes motor voltage and current information to indicate the motor speed. A switching regulator or DC to DC step down controller is utilized in a method which converts a battery voltage to a lower voltage that is supplied to the motor.

The voltage regulator/controller serves as a voltage reference means and provides a reference voltage, a first input means provides a compensating current input to the DC motor, a control means for controlling the flow of compensating current to the DC motor is cooperative with the first input means to generate the compensating current input to the DC motor, and a second input means provides a feedback signal generated by the motor to the voltage regulator/controller. The voltage regulator/controller compares the feedback signal to the voltage reference signal and generates a signal input to the control means, thus to drive said first input means which provides a compensating current input to the DC motor to regulate motor speed. Smoothing means are included in the first input means for smoothing the compensating current input to the DC motor, thereby filtering out spikes and pulses.

Because the drive signals are not pulsed, the motors are driven by relatively smooth, slowly varying current levels in order to maximize brush and gear box life. The power consumed from the power supply is minimized by the present invention. Because the switching regulator operates as an on/off switch, the power output of the motor drive circuit is not continuous. Furthermore, due to filtering of the output signal, there is no pulsed input to the motor, and current peaks are lower. The present invention is particularly useful in battery powered systems.

The motor drive circuit provides a speed correction input to the motor which is compatible with the analog current input to the motor and thus a more useful velocity profile for the motor, to prolong brush and gear life of said motor. Eliminating pulsed inputs to the motor minimizes power losses in the motor winding because currents are kept to a minimum.

Additional features and advantages of the above described invention will be better understood when the drawings described below are considered with the detailed description which follows.

A BRIEF DESCRIPTION OF THE DRAWINGS

FIG. 1 is a block diagram illustrating the speed control circuit of the present invention in a microprocessor driven circuit;

FIG. 2 is a schematic circuit diagram of a preferred embodiment of the invention; and FIGS. 3a–g are a series of waveform diagrams which further illustrate the operation of the speed control circuit of the present invention.

DESCRIPTION OF THE PREFERRED EMBODIMENT

Referring to FIG. 1, a motor drive circuit 10 includes a microprocessor 12 driven by an external power supply 14 including two nine volt batteries 11. The microprocessor 12 delivers a power input to a two channel digital-to-analog (D/A) converter 16 with separate analog outputs being provided to a first motor drive circuit 18A and a second motor drive circuit 18B to drive respective DC motors A and B.

Because the motor drive circuits 18A and 18B are virtually identical in all respects, FIG. 2 discloses only the motor drive circuit 18A and its associated speed control circuit 20, the circuits 18A and 20 being used to drive and control the motor A.

The current output of the D/A converter 16 is converted to a voltage by an operational amplifier 21 which works in conjunction with internal resistors in the D/A converter 16. The output voltage at the operational amplifier 21 is directly proportional to the value written to the D/A converter 16. Full scale at the D/A converter 16 produces an output voltage of 5.0 V.

The motor drive circuit 18A includes a noninverting operational amplifier or op-amp 24 receiving a feedback input from a low pass filter provided by a resistor R26 and a capacitor C30. The resistor R26 and a resistor R28 define a voltage divider for the op-amp 24. A feedback input 24a to the op-amp 24 is provided from the motor A through a transistor Q31 operatively connected to a current sensing resistor R32. One input to op amp 24 is a feed-back voltage through a low pass filter (C30/R26) and a gain control circuit (R28/R26). A second input is a sense voltage proportional to motor current through the current sensing resistor R32. The output of op-amp 24 is a voltage which is applied to the switching regulator 40 and compensates for variations in loading applied to the DC motor.

A summing and inverting amplifier 34 receives a D/A set point voltage input from the D/A converter 16, a motor voltage input from the operational amplifier 24 and an offset voltage. Resistors R36, R37, and R38, provided in the respective above-noted inputs to the amplifier 34 are selected to provide respective voltage gains when ratioed with the resistor R65, thus to further control the respective inputs to the amplifier 34.

A switching regulator/regulator/controller 40 includes a voltage feedback (VFB) input 40a and a power drive (LX) output 40b. The output of operational amplifier 24, summing amplifier 34 and a summing network including resistors R42 and R44 and motor feedback 20b are applied to the voltage feedback input 40a of the. regulator/controller 40. The pulsed drive output from output 40b of the regulator/controller 40 is supplied to the speed control circuit 20 through a transistor Q46.

The speed control circuit 20 includes the transistor Q46 driving the circuit 20, as well as a source of battery power 48, with a diode D50, an inductor L52 and a capacitor C54 interposed between the battery 48 and the positive input to the motor A.

Basic Motor Equations

To understand the operation of the motor speed control circuit 20, it may be helpful to review the basic equations that describe the operation of a DC motor. The voltage applied to a DC motor at any given time is equal to the sum of the back EMF voltage generated by the motor plus the IR drop across the motor winding resistance:

$$V = V_{back} + (I)(R)$$

where V=motor voltage, $V_{back}$=motor back EMF, I=motor current, and R=motor winding resistance.

The back EMF is proportional to motor speed: $V_{back}=(K)(S)$, where K=back EMF motor constant in V/RPM and S=speed of the motor in RPM (revolutions per minute). Therefore, $$V = KS + IR$$

or $$S = (V-IR)/K \quad \text{(Equation 1)}$$

That is, the speed of a DC motor can be determined from the motor applied voltage V and the current through the motor, I, since the motor constant K and motor resistance R are known fixed quantities.

In the motor speed control circuit 20, the setpoint speed $S_{set}$ is established by the D-A voltage output from the operational amplifier 21. This setpoint speed is constantly compared to the measured speed S. The servo system raises or lowers the applied motor voltage V to attempt to maintain the speed S at the setpoint. For example, if the motor current increased due to increased torque loading, then V will be increased by the same amount as the resulting increase in the IR drop.

Current sensing for the motor A is accomplished by the noninverting operational amplifier 24 and the associated components of the motor drive circuit 18A. The resistor R32 is a current sensing resistor which converts motor current to a voltage (1 ma results in 1 mv of sensed voltage). The noninverting operational amplifier 24 amplifies this voltage with a gain of 20, as determined by the ratio of the resistors R26/R28. The capacitor C30 and the resistor R26 together act as a low pass filter to smooth out fast fluctuations in motor current which results in a voltage proportional to an average motor current at pin 24a of the amplifier 24. This output, in addition to being used by the motor speed regulator/controller 40 is also fed back to the microprocessor 12 for checks of motor current under software control.

Summing and inverting amplifier 34 sums the D/A set point voltage $V_{set}$, motor current I and an offset voltage $V_{os}$, such that the output at amplifier 34 is $-(K1)(V_{set})-(K2)(I)+(K3) V_{os}$. Resistors R42 and R44 form another summing network to sum the output of amplifier 34 with the motor voltage V to be fed into the voltage feedback input 40a to the switching regulator/controller 40. The voltage at the feedback input 40a of the regulator/controller 40 is equal to $$(K4)(V-RI)-(K5)(V_{set})+V_{os}$$

For the resistor values chosen $$VFB = 0.4(V-24.2I)-0.545(V_{set})+1.57 \quad \text{(Equation 2)}$$

If it is assumed that the total resistance in the motor control circuit 18A consists of the winding resistance and the Rds ON resistance of the drive transistor Q31, and such resistance equals 24.2 ohms, then (24.2)(I) represents the IR drop across the motor A and the drive transistor Q31. Note from Equation (1) above that V-IR can be written in terms of motor speed. If the motor A is defined as a Portescap 12 V winding motor, with 64/1 gearbox, such a relationship can be written as $$S = 9.77(V-IR)$$

where S is output speed (in RPM) at the output shaft of the gearbox, V is motor voltage, I is motor current, and R is motor resistance.

When the motor speed control circuit or servo system 20 is in regulation, the voltage at the feedback pin 40a will match the internal reference voltage of the regulator/controller 40, or a nominal 1.3 V. If the servo system 20 is in regulation, then $$1.3 = 0.4(V-IR)-0.545 (V_{set})+1.57$$

or $$(V-IR) = 1.36 V_{set} - 0.675 \text{ V}$$

substituting

S=(9.77)(V-IR) in the above, $$S = 13.3\ V_{set} - 6.59\ \text{RPM}$$

The output of the D/A converter 16 and op-amp 21, $V_{set} = 5(D/255)$ volts, where D is the decimal value written to the D/A converter 16, from 0 to 255 dec.

Therefore $$S = (0.261)D - 6.59\ \text{RPM} \qquad \text{(Equation 3)}$$

The voltage to the motor A is generated by the speed control circuit 20 including the DC to DC switching regulator/controller 40, the Field-Effect Transistor (FET) Q46, the battery 48, the inductor L52, and the "freewheeling" diode D50. The switching regulator technique was chosen to minimize power losses in the drive control circuit 18A to the motor A.

The transistor Q46 is driven into saturation or completely off by the power drive output 40b from the regulator/controller 40. The regulator/controller 40 has an internal oscillator whose frequency is determined by a capacitor C57 associated with the regulator/controller 40. Oscillator frequency is approximately 20 KHz as determined by the value chosen for the capacitor C57. The power drive output 40b of the regulator/controller 40 pulses on and off at this frequency whenever the voltage feedback input 40a to the converter 40 is below its internal reference voltage (approximately 1.3 V).

The transistor Q46 is driven on whenever the output of the regulator/controller 40 pulses low. When the transistor Q46 is on, current flows from the battery 48, through the inductor L52 to charge the capacitor C54 in the speed control circuit 20 to a higher voltage than the previous voltage. When the transistor Q46 is on, the inductor L52 causes the current to ramp up approximately linearly to its peak value.

When the voltage feedback input 40a to the regulator/controller 40 is above its internal reference voltage, the output of the regulator/controller 40 is high, forcing the transistor Q46 off. When the transistor Q46 shuts off, current flow continues through the "free wheeling" diode D50, and the current begins to linearly ramp down to some minimum value. The peak and minimum current values reached vary considerably depending on the difference between the battery voltage and the motor voltage, and the motor load torque.

The inductor L52 and the diode D50 act together to smooth the current flow and minimize current spikes and resultant power losses due to high currents. The capacitor C54 smooths the 20 KHz ripple voltage to the motor A to present a relatively slowly varying DC level to the motor A. The inductor L52 must be chosen for as low a reactance as practical and must be designed to pass the peak current without saturation. The capacitor C54 should have low ESR for minimum power loss, and the diode D50 should have a low forward voltage drop and be fast switching, e.g. a Schottky diode.

Because pulses are not applied to the motor A, the power loss in the motor winding is minimized, and brush life is extended because peak currents to the motor A are maintained as low as possible. In addition, mechanical vibration to the motor A and gearbox due to torque pulsations are minimized in the preferred motor drive technique described above.

FET Q56 controlled by the microprocessor 12 functions to turn 5.0 V power on and off through a voltage supply (VS) input 40c to the DC regulator/controller 40, allowing power from the regulator/controller 40 to be turned off when the motor drive circuit 18A is not needed, in order to minimize power consumption. A capacitor C58, provided on the switched power line between the transistor Q56 and the voltage supply input 40c of the regulator/controller 40, serves as a noise filter.

A capacitor C60 in a voltage feedback loop 20b of the speed control circuit 20 serves to provide "feed forward" phase compensation to help stabilize the servo loop 20 and minimize ripple to the motor A due to "hunting." Capacitor C60 also helps minimize peak currents in cases where the motor voltage is very low and currents through the inductor L52 would otherwise be able to "ratchet" up without limit. The capacitor C60 will tend to accentuate any rapid ramp in voltage across capacitor C54 due to a current increase to cause the regulator/controller 40 to cease driving the transistor Q46 before current to the inductor L52 can build up to sufficiently high values to cause the inductor L52 to saturate. The overall effect of the capacitor C60 is to increase back EMF input to the speed control circuit 20 thus to more rapidly modulate current inputs to the motor A.

A series of waveform diagrams associated with the speed control circuit 20 is shown in FIGS. 3a–g. A description of those diagrams might be also beneficial to an understanding of the speed control circuit 20. FIG. 3a shows the motor torque at the motor A, which is a cycle ranging from approximately one to ten seconds.

FIG. 3b shows the current through the sensing resistor R32, that current being proportional to motor torque.

FIG. 3c shows the voltage applied to the motor A from the speed control circuit 20. The voltage applied to the motor A, minus the current through the motor winding times the motor resistance, is proportional to the motor speed.

FIG. 3d shows the current through the inductor L52, the current ramping up to a peak value when the transistor Q46 is on for a period T of 50 micro seconds.

FIG. 3e shows the voltage across the free wheeling diode D50 with the peak voltage being approximately the voltage output of the battery, the minimum voltage being minus (−) 0.4 V. Current through the inductor L52 ramps up during periods of peak voltage across the diode D50. The period T for the diode D50 is approximately 50 microseconds as determined by the capacitor C57.

FIG. 3f compares the internal reference voltage for the regulator/controller 40 with the feedback voltage at the voltage feedback input 40a of the regulator/controller 40. Comparing FIG. 3f with FIG. 3g, it can be seen that as long as the feedback voltage is less than the internal reference voltage of the regulator/controller 40, the output voltage is pulsing the transistor Q46 on and off, and it continues to pulse on and off until the feedback voltage at the pin 40a equals or exceeds the internal reference voltage of the regulator/controller 40. The period T for FIGS. 3f and 3g is also 50 micro seconds.

Converter U58 converts +5.0 V to −5.0 V for the operational amplifier 21 and also serves as the negative reference voltage for the D/A converter 16. A transistor Q60 enables power to the operational amplifier 21 and to the converter U58 only when needed. The transistor Q60 is controlled by a selected microprocessor input (not shown).

While the invention has been particularly shown and described with reference to a preferred embodiment thereof, it will be understood by those skilled in the art that various changes in form and detail may be made therein without departing from the spirit and scope of the invention. In particular the values shown for the individual components of the circuit described herein are chosen to reflect a preferred embodiment of the present invention, and a change in such values or in such components will not affect the spirit and scope of the invention, as defined by the appended claims.

I claim:

1. A motor speed control circuit for controlling the speed of a DC motor energized with a voltage, said circuit comprising:

voltage-reference means (16 and 21) for generating an adjustable reference voltage;

first current feedback means (R32, R28, C30, R26 and items 24, 34) for applying a compensating voltage to the DC motor that compensates for variations in loading applied to the motor;

a switching transistor (Q46);

switching regulator control means (20, 40) for controlling on/off pulses used to turn the switching transistor on and off, to regulate the motor drive voltage;

operational amplifier summing means (34) for summing the adjustable reference voltage, the current feedback and an offset term which is a signal input to the circuit; and motor voltage feedback means R44, C60, for applying a voltage feedback signal generated by the motor to the switching regulator control means, the switching regulator control means being further operative wherein the sum of the first feedback signal generated by the current feedback means and a second feedback signal provided by an adjustable reference voltage is compared to an internal fixed reference voltage within the switching regulator (40) and to generate a train of output pulses from the switching transistor to a smoothing circuit (D50, L52, C54) whenever said sum is less than the internal fixed reference voltage, said smoothing circuit for smoothing the pulsed output from the switching transistor to provide a drive voltage to the DC motor, said pulsed output of said switching regulator resulting in minimum power loss and therefore maximum power efficiency in the circuit.

2. A motor speed control circuit as claimed in claim 1 and including a digital-to-analog converter providing a signal that determines a setpoint speed of the motor.

3. A motor speed control circuit as claimed in claim 2 and including a microprocessor for driving the digital-to-analog converter.

4. A motor speed control circuit as claimed in claim 3 and including a first operational amplifier provided between the digital-to-analog converter and the voltage reference means, which converts a current output of the digital-to-analog converter into a voltage input to the voltage reference means.

5. A motor speed control circuit as claimed in claim 4 and including means for generating a motor current feedback signal and a second operational amplifier connected to receive the motor current feedback signal, and in response thereto producing a current indicative output.

6. A motor speed control circuit as claimed in claim 5, further including a summing and inverting amplifier, with the output of the first operational amplifier associated with the digital-to-analog converter and the current indicative output of the second operational amplifier summed thereby, said summing and inverting amplifier providing a first input to the voltage reference means.

7. A motor speed control circuit as claimed in claim 6 and including means for providing an offset voltage to at least one input of the summing and inverting amplifier.

8. A motor speed control circuit as claimed in claim 7 wherein the voltage reference means comprises a voltage regulator/controller receiving the first input from the summing and inverting amplifier.

9. A motor speed control circuit as claimed in claim 8 wherein the first input means includes a battery, a free wheeling diode, an inductor, and a capacitor connected to an input to the motor.

10. A motor speed control circuit as claimed in claim 9 wherein the control means for controlling the flow of the compensating current to the motor comprises a first transistor driven by the signal output from the voltage reference means.

11. A motor speed control circuit as claimed in claim 10 wherein the means for sensing current includes a current sensing resistor connected in series with the motor, which provides the motor current signal input to the second operational amplifier.

12. A motor speed control circuit as claimed in claim 11 including a voltage feedback servo loop comprising a capacitor which provides feed forward phase compensation to help stabilize the servo loop and minimize ripple to the motor due to hunting.

13. A motor speed control circuit as claimed in claim 12 including transistor control means for switching the power to the regulator/controller on and off, thereby allowing the power of the regulator/controller to be turned off when the motor is not needed in order to minimize power consumption.

14. A motor speed control circuit as claimed in claim 13 and including converter means for supplying a negative potential to the operational amplifiers, the negative potential also serving as a negative reference to the digital-to-analog converter.

15. A motor speed control circuit as claimed in claim 14 including means for selectively enabling power to the operational amplifiers and the converter.

16. A motor speed control circuit as claimed in claim 15 wherein the power enabling means includes a transistor selectively controlled by the microprocessor.

17. A motor speed control circuit for controlling the speed of a DC motor energized with a current, said circuit comprising:

a voltage reference means (16 and 21) for generating an adjustable reference voltage;

a current feedback means (R28, R32, C30, R26 and items 24, 34) for applying a compensating current to the DC motor that compensates for variations in loading applied to the motor;

switching regulator control means including a control circuit (20) and a switching regulator (40) for controlling on/off pulses used to turn a switching transistor on and off to regulate the motor drive voltage; and motor voltage feedback means (R44, C60) for applying a voltage feed-back signal generated by the motor to the switching regulator control means, the switching regulator control means being further operative wherein the sum of a first feed-back signal generated by the current feedback output means and a second feedback signal generated by the motor as well as the signal provided as the adjustable reference voltage, is compared to an internal fixed reference voltage within the switching regulator (40), and to generate a train of output pulses to a smoothing circuit (D50, L52, C54) whenever said sum is less than the internal fixed reference voltage, said smoothing circuit for smoothing the pulsed output from the switching regulator to provide a drive voltage to the DC motor.

18. A motor speed control circuit as claimed in claim 17 and including a digital-to-analog converter providing an analog signal that determines a setpoint speed of the motor.

19. A motor speed control circuit as claimed in claim 18 and including a microprocessor for driving the digital-to-analog converter.

20. A motor speed control circuit as claimed in claim 19 and including a first operational amplifier provided between the digital-to-analog converter and the regulator/controller, which converts a current output of the digital-to-analog converter into a voltage input to the regulator/controller.

21. A motor speed control circuit as claimed in claim 20 and provided therein means for generating a motor current feedback signal including a current sensing resistor connected in series with the motor and a second operational amplifier connected to receive the motor current feedback signal, and in response thereto producing a current indicative output.

22. A motor speed control circuit as claimed in claim 21, further including a summing and inverting amplifier, with the output of the first operational amplifier associated with the digital-to-analog converter and the current indicative output of the second operational amplifier summed thereby, said summing and inverting amplifier providing a first input to the regulator/controller.

23. A motor speed control circuit as claimed in claim 22 wherein the compensating current input circuit includes a battery, a free wheeling diode, an inductor, and a capacitor connected to an input to the motor.

24. A motor speed control circuit as claimed in claim 23 wherein the control means for controlling the flow of the compensating current to the motor comprises a first transistor driven by the signal output from the regulator/controller.

25. A method for controlling the speed of a DC motor energized with a current, said method comprising:

generating an adjustable reference voltage from a voltage-reference means (16, 21);

applying a first feed-back signal generated by the motor and a second feedback signal generated by a current feedback means (R28, R32, C30, R26, and items 24, 34) to a switching regulator control means including a control circuit 20 and a switching regulator 40, said regulator having an internal reference voltage, comparing the first and second feed-back signals to the internal reference voltage generated by the switching regulator to generate a signal to the control circuit in response to the relative magnitude of the feedback signal and the reference voltage;

inputting a control signal to the control circuit for controlling the flow of a compensating current input to the DC motor, so as to regulate its speed;

applying the compensating current to the DC motor that compensates for variations in loading applied to the motor; and smoothing the compensating current input to the DC motor.

26. The method claimed in claim 25 including the step of applying a signal from a digital-to-analog converter to the switching regulator control means, said signal providing an input to determine a setpoint speed of the motor.

27. The method as claimed in claim 26 including the step of driving the digital-to-analog converter by a microprocessor.

28. The method as claimed in claim 27 including the step of converting a current output of the digital-to-analog converter into a voltage input to the switching regulator control means with a first operational amplifier provided between the digital-to-analog converter and the switching regulator control means.

29. The method as claimed in claim 28 including the step of applying a motor current feedback signal to a second operational amplifier, the second operational amplifier thereby to produce a current indicative output in response to the motor current feedback signal.

30. The method as claimed in claim 29, further including the step of summing the output of the first operational amplifier associated with the digital-to-analog converter and the current indicative output of the second operational amplifier with a summing and inverting amplifier, the output of said summing and inverting amplifier providing a first input to the switching regulator control means.

31. The method as claimed in claim 30 and including the step of providing an offset voltage to at least one input of the summing and inverting amplifier.

* * * * *